United States Patent [19]

Mozumder et al.

[11] Patent Number: 5,546,312
[45] Date of Patent: Aug. 13, 1996

[54] USE OF SPATIAL MODELS FOR SIMULTANEOUS CONTROL OF VARIOUS NON-UNIFORMITY METRICS

[75] Inventors: Purnendu K. Mozumder, Plano; Sharad Saxena, Dallas, both of Tex.

[73] Assignee: Texas Instruments Incorporated, Dallas, Tex.

[21] Appl. No.: 201,302

[22] Filed: Feb. 24, 1994

Related U.S. Application Data

[63] Continuation-in-part of Ser. No. 124,086, Sep. 20, 1993, abandoned.

[51] Int. Cl.⁶ .................................................. G06F 19/00
[52] U.S. Cl. ................. 364/468.03; 364/151; 364/468.28
[58] Field of Search ........................... 364/468, 488–491, 364/552, 554, 578, 579, 401, 402, 148–151; 437/7, 8, 51, 952, 958, 225

[56] References Cited

U.S. PATENT DOCUMENTS

| | | | |
|---|---|---|---|
| 4,796,194 | 1/1989 | Atherton | 364/468 |
| 4,807,148 | 2/1989 | Ben-Arieh et al. | 364/468 |
| 4,901,242 | 2/1990 | Kotan | 364/468 |
| 5,047,947 | 9/1991 | Stump | 364/468 |
| 5,105,362 | 4/1992 | Kotani | 364/468 |
| 5,111,404 | 5/1992 | Kotani | 364/468 |
| 5,130,932 | 7/1992 | Kaihava et al. | 364/468 |
| 5,229,948 | 7/1993 | Wei et al. | 364/468 |
| 5,280,425 | 1/1994 | Hogge | 364/402 |
| 5,305,221 | 4/1994 | Atherton | 364/468 |
| 5,307,296 | 4/1994 | Uchida et al. | 364/578 |
| 5,399,229 | 3/1995 | Stefani et al. | 156/626 |
| 5,408,405 | 4/1995 | Mozumder et al. | 364/151 |

OTHER PUBLICATIONS

Purnendu K. Mozumder et al, "Method for Semiconductor Process Optimization Using Functional respresentation of Spatial Variations and Selectivity", 1991, pp. 115–121.

*Primary Examiner*—James P. Trammell
*Attorney, Agent, or Firm*—Ruben C. Deleon; James C. Kesterson; Richard L. Donaldson

[57] ABSTRACT

A method and system have been described for simultaneously controlling one or multiple metrics of non-uniformity using a model form independent multi-variable controller. The method comprising: utilizing process models relating a plurality of product quality parameters to the plurality of process control variables; measuring a plurality of product quality parameters on a first plurality of products; exercising statistical quality control tests on the plurality of product quality parameters of the first plurality of products; continuing processing if statistical quality control tests do not indicate significant difference from model prediction and observables; otherwise measuring the plurality of product quality parameters on a second plurality of products; tuning the process models to create tuned process models using the plurality of product quality parameters from the first and the second plurality of products, wherein the tuning estimates a changed state of the processing with the use of process models; estimating new values for the plurality of process control variables from the tuned models; processing a third plurality of products at the new values of the plurality of process control variables; measuring the plurality of product quality parameters on the third plurality of products; repeating the tuning of the process models and the estimating new values for the plurality of process control variables if the quality control parameters from the third plurality of products are not acceptable; otherwise continuing processing products with the new values of the plurality of process control variables if the quality control parameters from the third plurality of products are acceptable. The process models may include site models, wherein the site models would model metrics of non-uniformity and asymmetry as functions of sites.

17 Claims, 7 Drawing Sheets

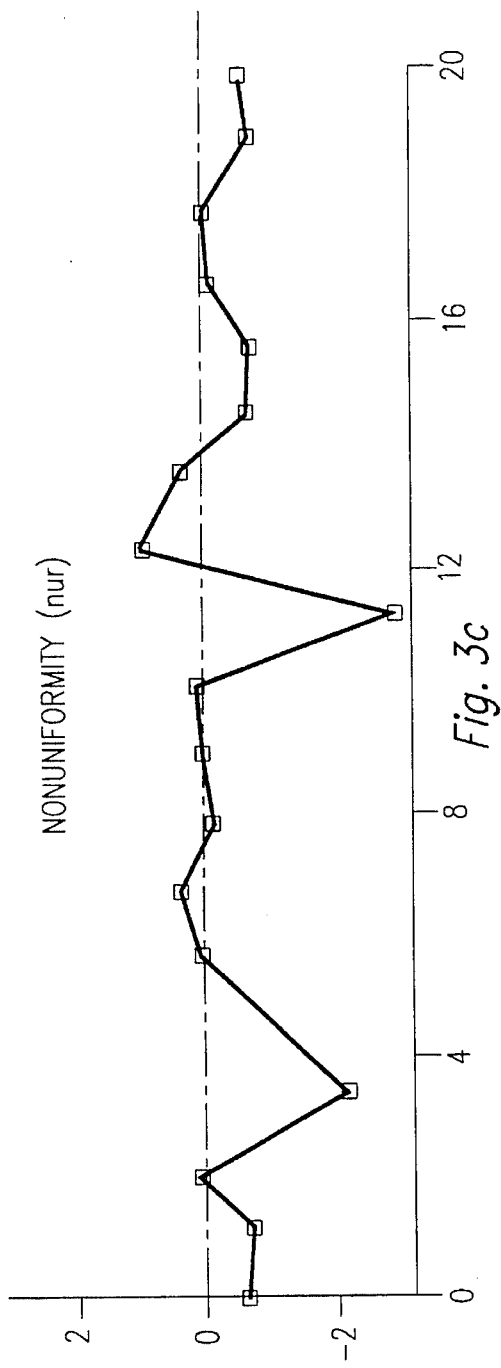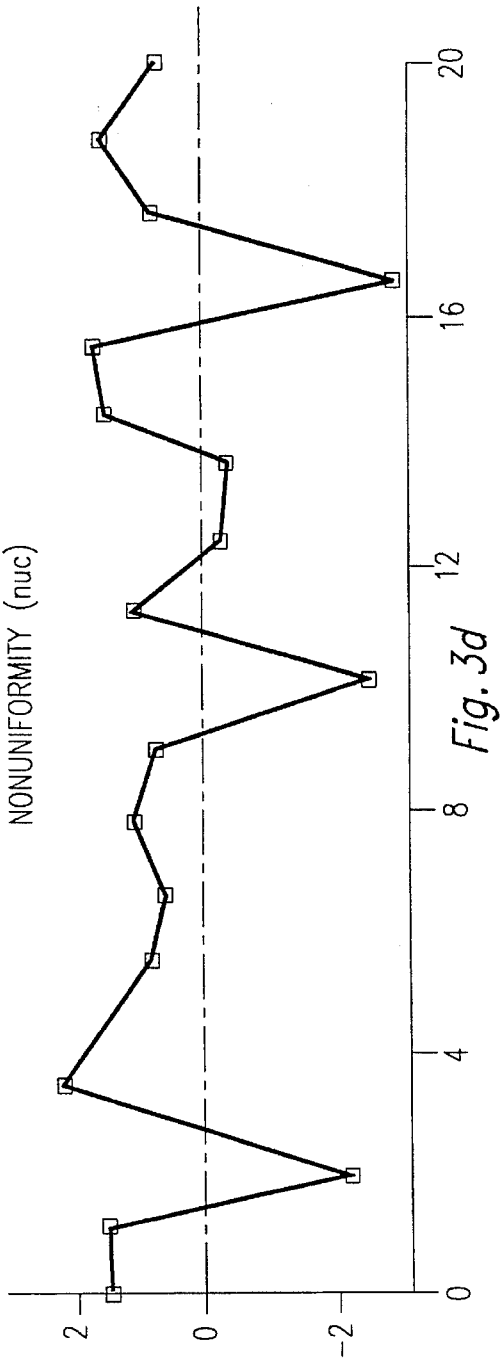

USE OF SPATIAL MODELS FOR SIMULTANEOUS CONTROL OF VARIOUS NON-UNIFORMITY METRICS

This application is a continuation in part of patent application Ser. No. 08/124,086, filed on Sep. 20, 1993 now abandoned.

FIELD OF THE INVENTION

This invention generally relates to the use of spatial models for simultaneous control of various non-uniformity metrics for manufacturing of discrete products.

CROSS-REFERENCE TO RELATED APPLICATIONS

The following coassigned patent application is hereby incorporated herein by reference:

| Serial No. | Filing Date | TI Case No. | Patent No. |
|---|---|---|---|
| 08/124,083 | 09/20/93 | T17639 | 5408405 |

BACKGROUND

Manufacturing of many types of discrete products can benefit from multi-variable computerized controllers. The semiconductor wafer processing area is an example of an area of particular interest. The small feature sizes and the large number of steps required to fabricate state of the art integrated circuits (on semiconductor wafers) make it essential that each of the process steps meet a tight set of specifications. Since process variations are inevitable, statistical process control (SPC) is one of the techniques used for controlling fabrication processes. Often, implementing SPC on a wafer-by-wafer basis requires having equipment with in-situ sensors for measuring the desired quality characteristics, or making changes to existing equipment to incorporate in-situ sensors. Obtaining new equipment with in-situ sensors or modifying existing equipment can be expensive. In addition to the cost of the sensors, adding sensors to existing equipment can cause expensive down-time and decrease mean time between failure (MTBF).

A multi-variable statistical process controller for discrete manufacturing was created to assist in fabricating products. The controller is described in detail in patent application Ser. No. 08/124,083, filing date Sep. 20, 1993 U.S. Pat. No. 5,408,405. An embodiment of the controller was described in reference to semiconductor wafer processing. One of the goals of the monitor based control strategy is to determine if the equipment and process state has changed from its previous estimate based on the monitor wafers (test wafers), and if so, determine a set of corrections to the equipment settings to generate a new process recipe and bring the product quality characteristics on target. A prerequisite for the controller are models of the process and equipment that relate the effects of the equipment controls to the output parameters of interest. An important aspect of the algorithm is its independence from the model form. The controller performs three tasks: sensing process state changes based on product measurements (Statistical Quality Control), adapting the models to the new state (model tuning), and determining the new settings to correct for the state change (sequential optimization).

In the cross-referenced patent application (Monitor Wafer Controller), the same parameters were found to be the quality characteristics (e.g. the non-uniformity, asymmetry, ...) of the process as well as the measured parameters (the observables). This meant that the same parameters were used for tuning as well as optimization. Furthermore, the models for Monitor Wafer Controller were mappings from the equipment controls to the quality characteristics. But, in general, the parameters to be optimized may not coincide with the measured parameters. For example, in a PETEOS (plasma enhanced TEOS-tetraethylorthosilicate) process, the TEOS deposition rate at nine locations and the stress were measured on each wafer, whereas, the parameters to be controlled were: the average deposition rate, several metrics of non-uniformity as a function of the nine sites on the wafer, and the stress.

Often, some of the process quality measures may not model well in terms of the process settings, but it may be expressible as a function of other measurables that are well modeled. For example, in the PETEOS process the measure of nonuniformity did not model well as a response surface directly (George E. P. Box, William G. Hunter, and J. Smart Hunter. *Statistics For Experimenters*. Wiley Series in Probability and Mathematical Statistics. John Wiley & Sons, Inc., New York, 1978.), however the deposition rate at nine sites models well, and the nonuniformity measures can be expressed in terms of the site models. Additionally, often a process quality measure can not be defined as a single (scalar) numeric quality. For example, nonuniformity can be defined by a multitude of measures. The control scheme described in the cross-referenced application would represent that each of these measures be modeled separately, which is time consuming and would in some cases lead to poor models making the controller ineffective.

SUMMARY OF THE INVENTION

To summarize the concerns, non-uniformity control is very important, but does not model well directly. Following, since sites do model well, non-uniformity metrics can transfer over to site models to control non-uniformity. Additionally, the use of site models alleviates the need to model a number of different nonuniformity metrics separately.

The present invention overcomes the above outlined problems and is described in relation to semiconductor manufacturing processes. Two features were added to the Monitor Wafer Controller described in the cross-referenced application. One feature was to create a separation between models and goals for the controller. Models relate the controllables (equipment controls) and measurable quantities (parameters that can be directly interpreted from sensor readings) to the process goals. Goals are expressed as functions of the model outputs (a degenerate case would be one where the goals are identically the outputs of the models). Another feature was the decision to use spatial (site) models. The metrics of non-uniformity and asymmetry would not be modeled directly in terms of the equipment controls, but would be represented as functions of the sites. The advantages and applicability of spatial models in process optimization has been discussed in Purnendu K. Mozumder and Lee M. Loewenstein, Method of Semiconductor Process Optimization Using Functional Representations of Spatial Variations and Selectivity, *In Proceedings of the Eleventh IEEE/CHMT International Electronic Manufacturing Technology Symposium*, Pages 115–121, September 1991. The present invention utilizes spatial models for controlling non-uniformities. The tuning procedure updates all the models based on the inputs corresponding to the local experiment design and the measured values corresponding to the model outputs, while the process is optimized with respect to the targets or constraints specified on the goals. Determining new values for the process control variables involves optimization to achieve the process goals. During sequential optimization, instead of model outputs, the goals are optimized.

A method and system have been described for simultaneously controlling one or multiple metrics of non-uniformity in conjunction with other process quality parameters using a model form independent multi-variable controller. The method comprising: utilizing process models relating a plurality of product quality parameters to the plurality of process control variables; measuring a plurality of product quality parameters on a first plurality of products; exercising statistical quality control tests on the plurality of product quality parameters of the first plurality of products; continuing processing if statistical quality control tests do not indicate significant difference from model prediction and observables; otherwise measuring the plurality of product quality parameters on a second plurality of products; tuning the process models to create tuned process models using the plurality of product quality parameters from the first and the second plurality of products, wherein the tuning estimates a changed state of the processing with the use of process models; estimating new values for the plurality of process control variables from the tuned models; processing a third plurality of products at the new values of the plurality of process control variables; measuring the plurality of product quality parameters on the third plurality of products; repeating the tuning of the process models and the estimating new values for the plurality of process control variables if the quality control parameters from the third plurality of products are not acceptable; otherwise continuing processing products with the new values of the plurality of process control variables if the quality control parameters from the third plurality of products are acceptable. The process models may include site models, wherein the site models would model quality characteristics at each site. In addition, the different measures of non-uniformity and asymmetry can be defined in terms of site models. Furthermore, the process goals to be controlled can be specified as a function of the models, thereby providing a separation between models and goals.

BRIEF DESCRIPTION OF THE DRAWINGS

The foregoing and further aspects of the invention are illustrated in the accompanying drawings wherein like elements are denoted by like reference designators and in which.

DETAILED DESCRIPTION OF THE PREFERRED EMBODIMENTS

The preferred embodiments describe a monitor wafer controller for the PETEOS process. This description is not meant to limit the invention to this process. The AMT 5000 reactor made by Applied Materials was used for running the process. It is to be understood that the scope of the invention also comprehends embodiments different from those described, yet within the scope of the claims. Specifically, the invention could be used with any discrete product manufacturing where control of one or multiple non-uniformity metrics is desired.

The preferred embodiment is discussed with the use of site models for the PETEOS process, the associated metrics of non-uniformity used as goals, tuning procedure for both the site and the stress models.

The Monitor Wafer Controller was tested on a process for TEOS based plasma-enhanced CVD (chemical vapor deposition) (PETEOS). The primary equipment controls for this process on the AMT 5000 are gas pressure, RF power, wafer temperature, shower head to wafer spacing, TEOS flow, and oxygen flow, and susceptor temperature. The primary goals for the silicon dioxide film were: deposition rate (Å/s), a number of thickness non-uniformity metrics, 10% HF etch rate (Å/s), stress (MPa), density (g/cc) and mass (g).

For model based control, models were required that could be adapted to incorporate the process and equipment state changes, and be used to determine optimal settings to bring the quality characteristics of the process to target. It was decided to create response surface models (RSMs) using design of experiments (DOEs).

A full quadratic model for the nine deposition rates and stress in terms of the five equipment controls was used in the preferred embodiment. The model is of the form:

$$y_k = \beta_o + \sum_{i=1}^{5} \beta_i x_i + \sum_{i=1}^{5} \sum_{j \leq 1}^{5} \beta_{ij} x_i x_j \quad (1)$$

where dr1, . . . , dr9 is the deposition rate at the nine sites, $y_k$ is the kth output, i.e., dr1, . . . , dr9, stress, $x_i, x_j$ are the i,jth input, i.e., Pressure, . . . , $O_2$, $\beta_O$ is the constant term in the equation, $\beta_i$ is the coefficient of the linear term $x_i$, and $\beta_{ij}$ is the coefficient of the quadratic term $x_i x_j$.

All 21 coefficients were estimated using SAS (Statistical Analysis System) (SAS Institute, Inc., SAS Circle Box 8000, Cary N.C. 27512-8000. *SAS Language Guide,* release 6.03 edition, 1988).

TABLE 1

| | Coordinates for Oxide Film Measurement Sites on Wafers | | | | | | | | |
|---|---|---|---|---|---|---|---|---|---|
| Site Numbers | Site 1 | Site 2 | Site 3 | Site 4 | Site 5 | Site 6 | Site 7 | Site 8 | Site 9 |
| x-coordinate in mm | 0.0 | 0.0 | 48.2 | 0.0 | −48.2 | 47.7 | 47.7 | −47.7 | −47.7 |
| y-coordinate in mm | 0.0 | 48.2 | 0.0 | −48.2 | 0.0 | 47.7 | −47.7 | 47.7 | −47.7 |

Figure 1:
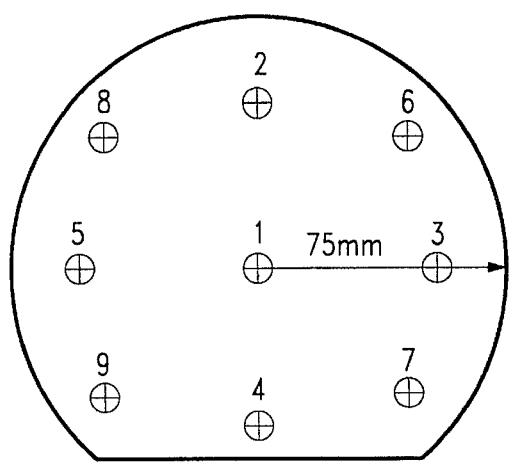
FIG. 1 is a diagram of oxide film measurement sites on a semiconductor wafer.

At the time of the experiment, several possible metrics of non-uniformity were being investigated. For each wafer, the oxide thickness was measured at 9 sites. The sites were chosen based on analysis of the profile of the oxide film on the wafer. FIG. 1 shows the sites used for measuring the oxide thickness. Table 1 provides the coordinates for each of the sites. It was observed during the modeling that the deposition rate for each of the 9 sites could be modeled very accurately as a function of the equipment controls. For the PETEOS process, four metrics of non-uniformity were used. Two of them have to be controlled to target, the other two are controlled to be within specification limits. The former metrics of non-uniformity, which are controlled to target, are denoted by nur and nuc, and are expressed in terms of the site deposition rates as:

$$nur = \frac{(dr2 + dr3 + dr4 + dr5) - (dr6 + dr7 + dr8 + dr9)}{4} \quad (3)$$

and $$nuc = \frac{(dr1 + dr2 + dr3 + dr4 + dr5 + dr6 + dr7 + dr8 + dr9)}{9} - dr1 \quad (3)$$

The two later metrics, which are controlled to specification limits, are measures of asymmetry in deposition, and are denoted as cant1 and cant2. These metrics are expressed in terms of deposition rates as:

$$cant1 = \frac{(dr7 + dr8) - (dr6 + dr9)}{(dr1 + dr2 + dr3 + dr4 + dr5 + dr6 + dr7 + dr8 + dr9)} \quad (4)$$

and $$cant2 = \frac{(dr6 + dr7) - (dr8 + dr9)}{(dr1 + dr2 + dr3 + dr4 + dr5 + dr6 + dr7 + dr8 + dr9)} \quad (5)$$

Figure 2:
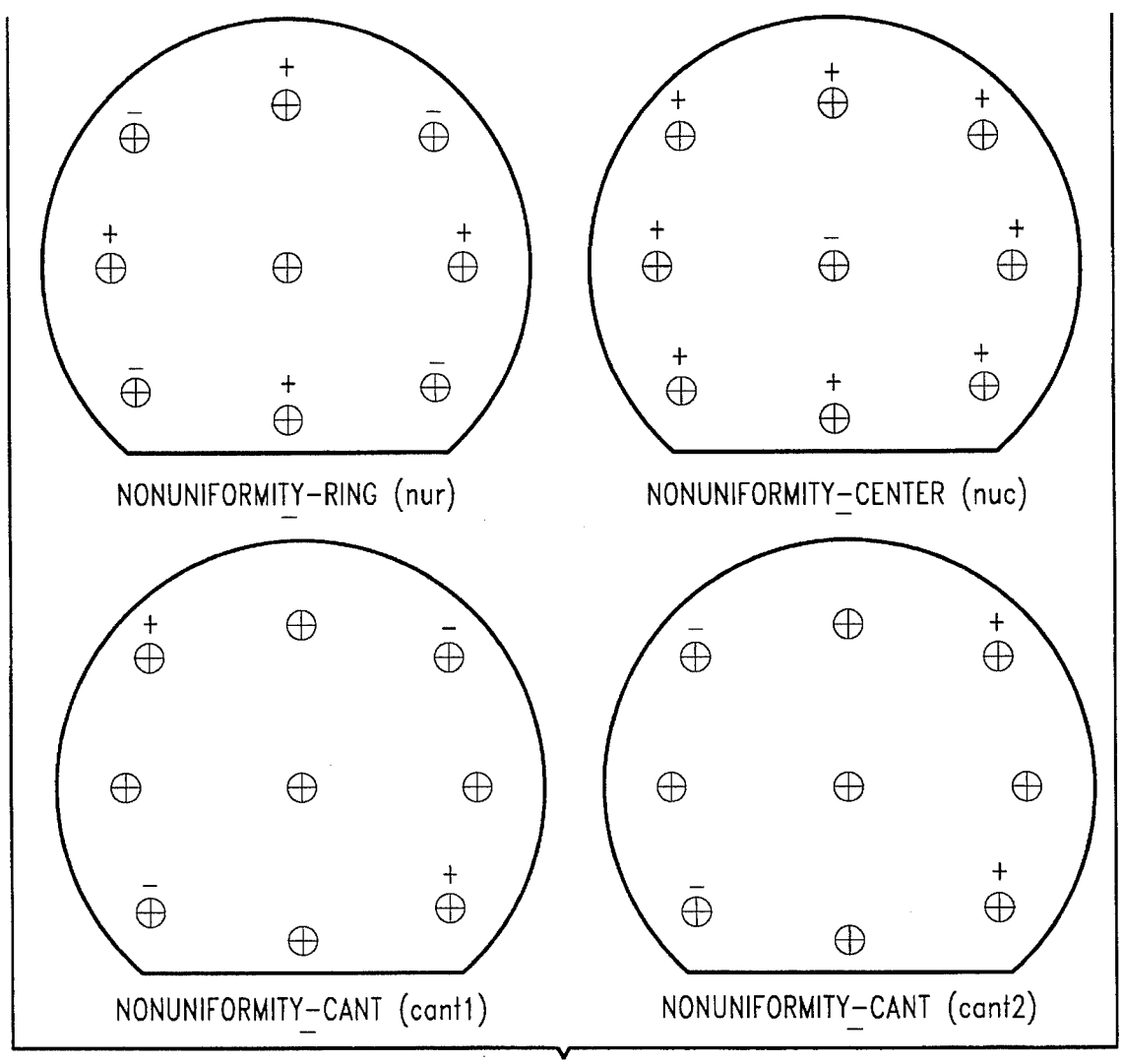
FIG. 2 is a diagram defining the non-uniformity metrics for the PETEOS process.

FIG. 2 shows four deposition non-uniformity metrics defined in terms of the nine sites.

Similar to the non-uniformities, the mean deposition rate, dr, is expressed as a function of the deposition rates as:

$$dr = \frac{(dr1 + dr2 + dr3 + dr4 + dr5 + dr6 + dr7 + dr8 + dr9)}{9} \quad (6)$$

TABLE 2

Equipment Control Ranges for Experiment Design for PETEOS on an AMT 5000.

| Setting (Units) | Pressure (Torr) | RF (Watts) | Gap (mm) | TEOS (SCCM) | O₂ (SCCM) |
|---|---|---|---|---|---|
| Max | 9.5 | 560 | 220 | 1100 | 520 |
| Nominal | 9.0 | 460 | 210 | 1000 | 440 |
| Min | 8.5 | 360 | 200 | 900 | 360 |

To make the models compact for control purposes, it was necessary to "trim" the models. It was decided to make the models compact using stepwise regression in SAS. A part of the modeling involves determining if there are influential points in the data and if there are significant outliers that skewed the model. A summary of model fits after outlier rejection is given in Table 3.

TABLE 3

Model Statistics for PETEOS on AMT 5000.

| Parameter | dr 1 | dr 2 | dr 3 | dr 4 | dr 5 | dr 6 | dr 7 | dr 8 | dr 9 | Stress |
|---|---|---|---|---|---|---|---|---|---|---|
| RMS Error | 1.177 | 1.126 | 1.226 | 1.267 | 1.060 | 1.332 | 1.383 | 1.515 | 1.297 | 9.182 |
| $R_2$ | 0.992 | 0.992 | 0.990 | 0.989 | 0.993 | 0.988 | 0.987 | 0.985 | 0.989 | 0.994 |
| Adj. $R_2$ | 0.986 | 0.985 | 0.982 | 0.980 | 0.987 | 0.978 | 0.976 | 0.972 | 0.980 | 0.991 |

Similar to the use of the Monitor Wafer Controller described in the cross-referenced application, one of the goals of the Monitor Wafer Controller for the PETEOS process is to use the monitor wafers to estimate the process state, and if the process state has changed, the controller determines a recipe that would bring the product quality characteristics on target. The controller accomplishes this in two stages. The first stage is model tuning. A multi-variable model form independent control strategy was used in the controller. In this stage, the controller estimates changes in the models required to capture the changed process state. Mathematically, the problem of tuning can be formulated as the following weighted least squares minimization problems:

$$\min_{g_j, o_j} \frac{1}{w_1 s_1^2} \sum_{k=1}^{n} [y_{1k} - f_1(g_1^* x_1, x_2 + o_2, g_3^* x_3, A_1, c_1)]^2 \quad (7)$$

$$+ \frac{1}{w_m s_m^2} \sum_{k=1}^{n} [y_{mk} - f_m(g_1^* x_1, x_2 + o_2, g_3^* x_3, A_m, c_m)]^2 \quad (8)$$

and $$\min_{\delta_i} \frac{1}{w_1 s_1^2} \sum_{k=1}^{n} [y_{1k} - f_1(g_1^{**} x_1 + o_2^*, g_3^{**} x_3, A_1, c_1 + \delta_1)]^2 \quad (9)$$

$$+ \frac{1}{w_m s_m^2} \sum_{k=1}^{n} [y_{mk} - f_m(g_1^{**} x_1, x_2 + o_2^*, g_3^{**} x_3, A_m, c_m + \delta_m)]^2 \quad (10)$$

where
 $x_i$ is the ith controllable,
 $y_i$ is the ith observable, $f_i$ represents the functional form of the model corresponding to $y_i$, $w_i$ is the weight corresponding to $f_i$, $A_i$ represents the vector of coefficients in $f_i$, $c_i$ are the bias/constant terms in $f_i$, $g_i$ is the gain corresponding to $x_j$, $o_j$ is the offset corresponding to $x_j$, and $\delta_i$ corresponds to the bias added to $c_i$.

In the Monitor Wafer Controller, the models were weighted by the respective estimated variances (the variances are estimated during model construction). This is because a deviation from model predictions for models with small variance should be penalized more than a same deviation from models with large variance. The use of variances for weighting is sufficient if the models represent statistically independent, or quasi-independent, random variables.

If a process state change is detected, the controller attempts to find a recipe that will bring the goals to target. This is the purpose of the sequential optimization. Mathematically, using the previous notation, the sequential optimization task can be formalized as:

$$\min_{x_1, \ldots, x_n} \sum_{i=1}^{p} w_i [y_i^* - t_i(f_1(x_1, \ldots, x_n), \ldots f_m(x_1 \ldots, x_n))]^2 \quad (11)$$

such that $$y_i^L \leq g_i(f_1, \ldots f_m) \leq y_i^H,$$

$i = 1, \ldots, p;$ and $x_i^L \leq x_i \leq x_i^H, j = 1, \ldots, n;$ where $y_i^L$, $y_i^H$ are the low and high specification limits on the ith output, $y_i$, $t_i()$ are the functions transforming models to goals, $x_j^L$, $x_j^H$ are the low and high limits on the jth input, $x_j$, $f_i()$ is the tuned model representing the transformation from $x_j$s to $y_i$, $h_k()$ is the model representing the transformation from $x_j$s to $z_k$, $y_i^*$ is the goal/target output value corresponding to $y_i$, and $w_i$ is the weighting corresponding to the ith output parameter $y_i$, $g_i$ is any transformation on the site models.

The above formulation show that process goals are different from the models through the use of the function $t_i$. Furthermore, this formulation accommodates process goals that could be either targets or constraints.

The above discussion shows that process goals could be different from the modeled parameters. Furthermore, goals can be of two types: targets and constraints. Targets are explicitly optimized by the optimizer. Constraints further restrict the allowable subspace of equipment settings in which the optimizer seeks to optimize the targets. The controller requires that weights be specified for the optimizations performed during model tuning and sequential optimization.

As with the Monitor Controller in the cross-referenced application, the weights for sequential optimization reflect the relative importance of different targets that are optimized. Selecting these weights requires some judgment and experience with the process being controlled. The objective is to find a set of weights that enables the optimizer to produce a recipe that brings the process within allowed tolerances and as close to the target as possible, without violating any constraints.

A second set of weights arise in the optimization performed during model tuning. The weighting provided by the model variances is appropriate if the models represent statistically independent, or quasi-independent random variables. However, in the case of site models and deposition rate, the models represent random variables that can be expected to be correlated with each other. As a result, since there are nine site models and one stress model in the tuning equation, the tuning is biased to compensate more for errors in predicting deposition rate than errors in predicting stress. That is, ignoring the weighting due to model variances, deposition rate is considered roughly nine times as important as stress. A more general solution is to explicitly introduce weighting in addition to model variance. Therefore, in tuning the weight for the model, $f_i$ is taken to be $w_i s_i^2$. In the PETEOS controller $w_i=9$ for each of the nine site models, and $w_i=1$ for the stress model.

The monitor wafer based controller was tested using the same technique used to test the controller in the cross-referenced application. Single and multiple faults were introduced in the AMT 5000 reactor for PETEOS.

For single faults, one of the equipment settings was altered from the value specified by the process recipe. For multiple faults, more than one setting was altered from the process recipe. Four monitor wafers were then measured. The controller was provided with the measurements, and the adjusted recipe produced by the controller was used to verify the correctness of the controller actions.

Figure 3A:
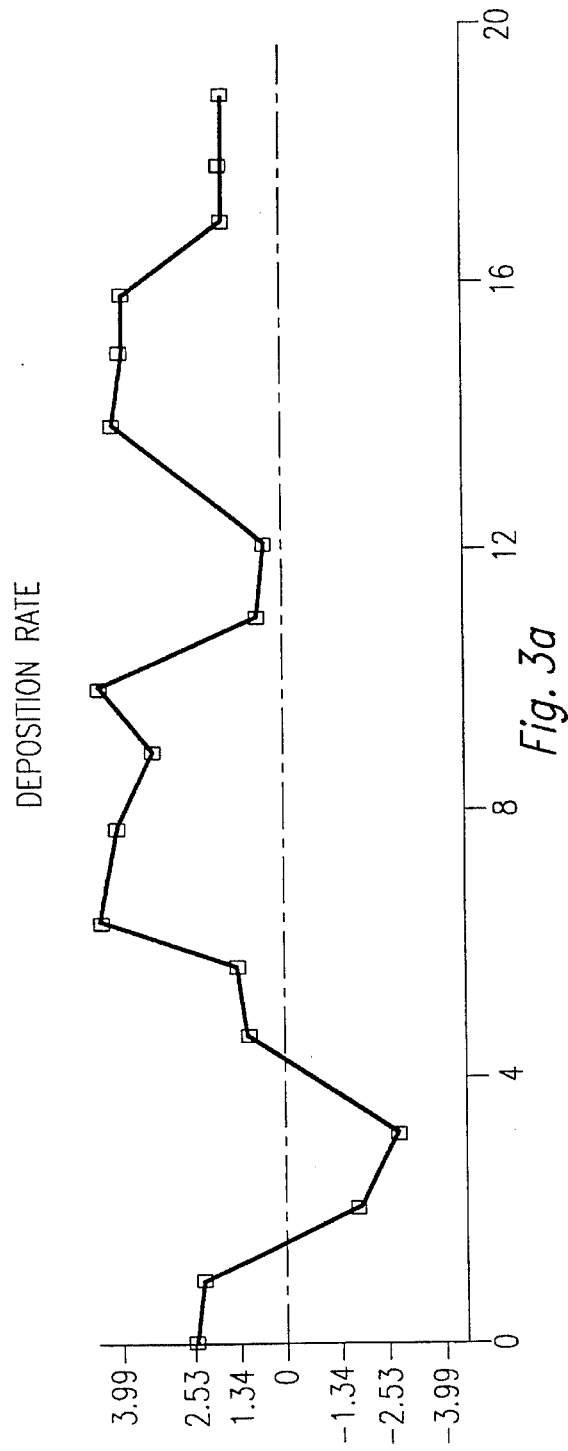
FIG. 3 is a set of four graphs depicting the behavior of the monitor wafer controller for PETEOS during tests.
Figure 3B:
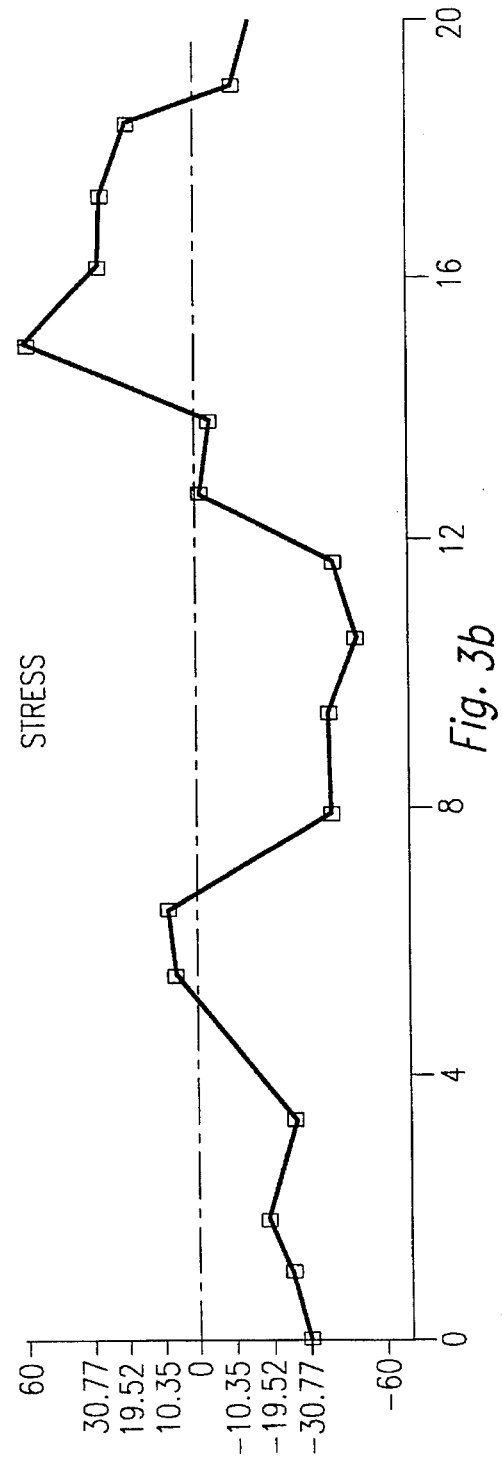
Figure 4A:
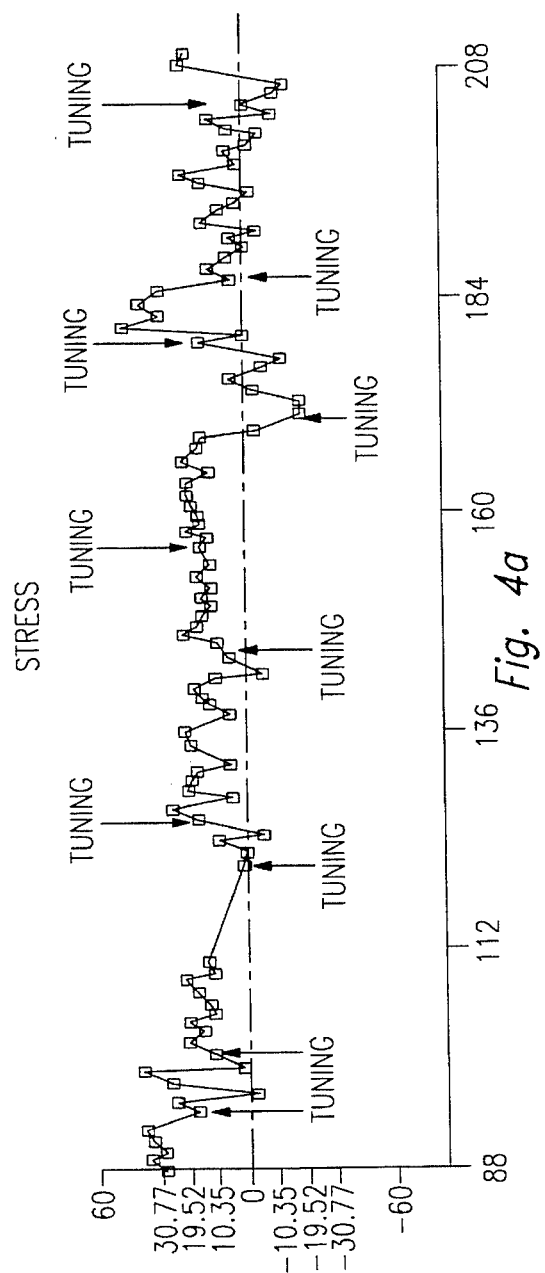
FIG. 4 is a set of four graphs depicting a portion of the controller's performance during routine operation.
Figure 4B:
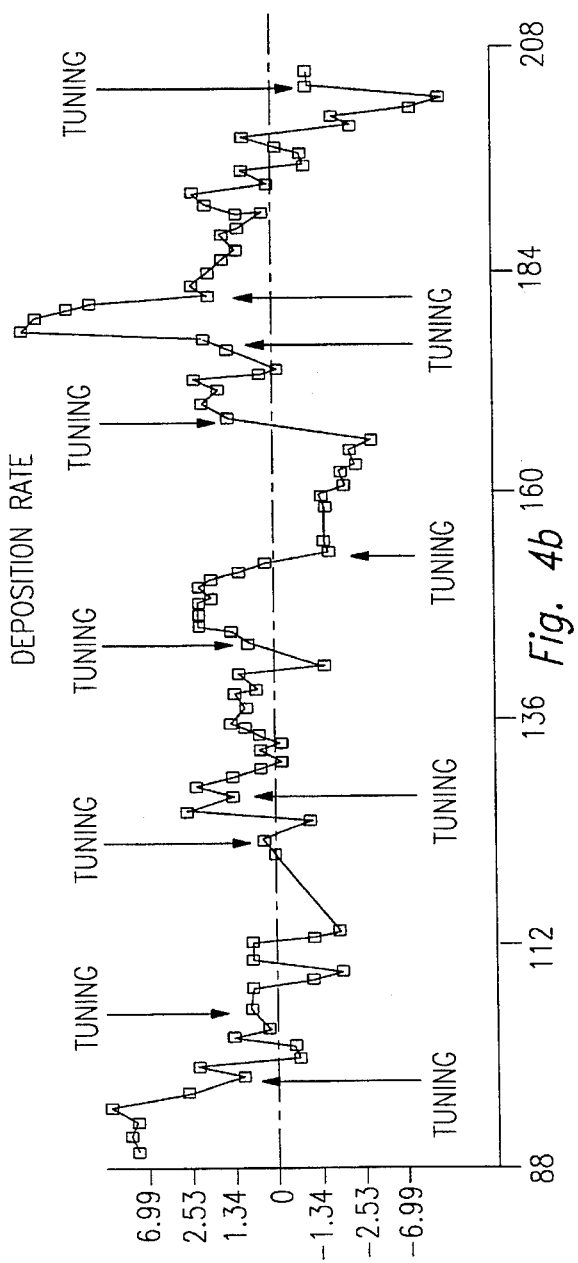
Figure 4C:
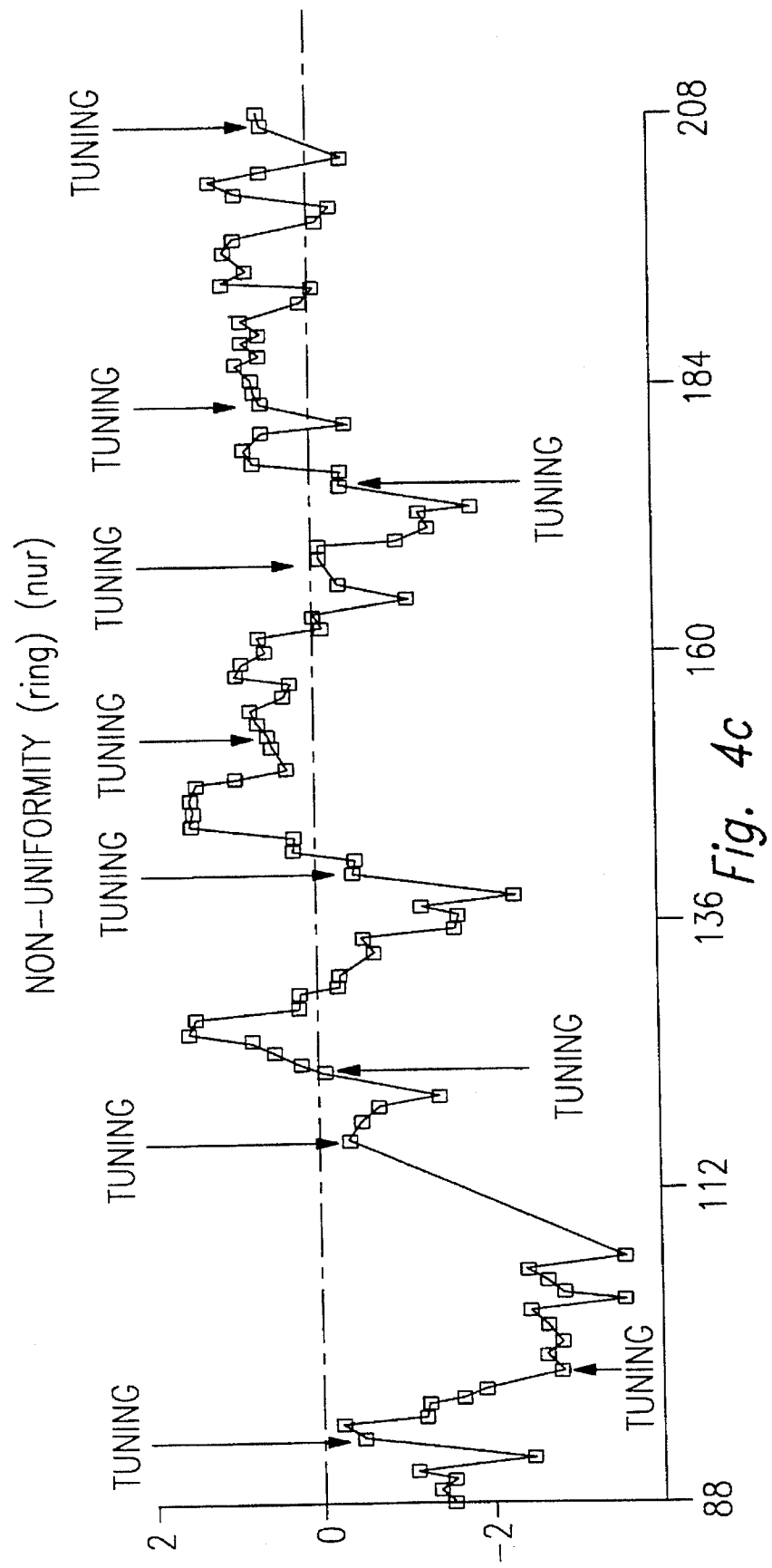
Figure 4D:
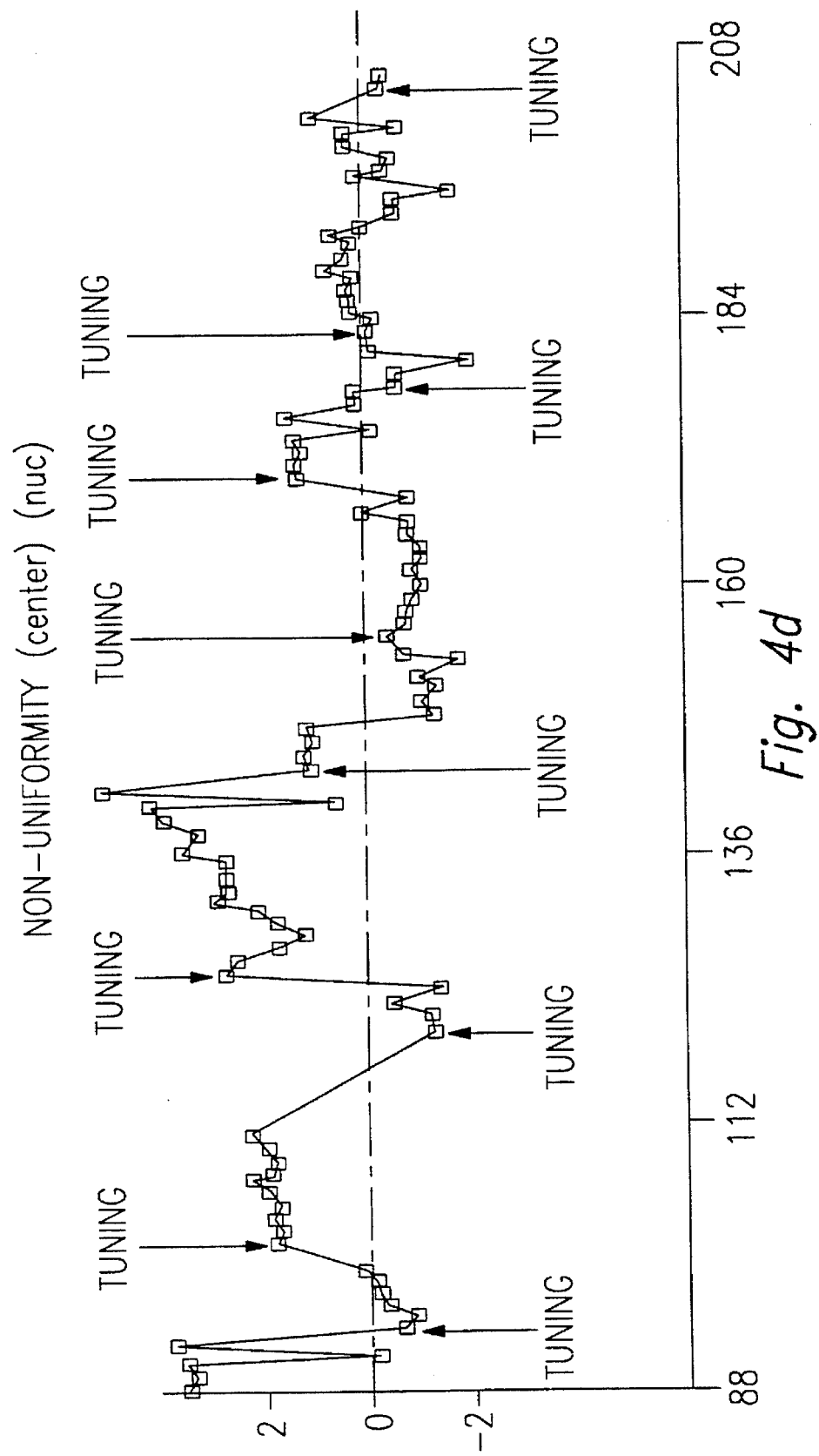

FIG. 3 illustrates the behavior of the controller. The first two plots in FIG. 3 show SQC charts for two of the quality characteristics monitored for this process; namely deposition rate and compressive stress on the wafer due to the deposited film. The plots show the deviation between the model prediction and the observed output. The four horizontal lines on either side of the central line in the charts are the 1-sigma, the 2-sigma, the 3-sigma, and the specification limits for the process.

The third and the fourth plot show two non-uniformity metrics nuc and nur, which are defined in Equations 3 and 4. Since SQC is not performed on these non-uniformity metrics, the plots do not strictly correspond to SQC charts. The process requirement is to have both these non-uniformity measures within ±2Å/s. The plots show the values attained by the non-uniformity metrics when the process is run with the recipe having the faults, and with the recipe computed by the controller after compensating for the faults.

In the TEOS fault, the delivered TEOS flow was 5% lower than the value prescribed by the recipe. The first four points of FIG. 3 show the effect of this fault on the process. The difference between model predictions and the observed values of the deposition rate is greater than 2-sigma at the two center points of the four point local design. The difference of the observed values from model predictions in stress for these points is about 3-sigma. Both the non-uniformity metrics are within specification; however, both metrics (especially nuc) show that the wafers are slightly non-uniform.

Points 5 and 6 in the plots show the outputs obtained from the process with the recipe computed by the controller after compensating for the TEOS fault. Deposition rate is within 1-sigma of model prediction, stress is between 1 and 2-sigma away from the model prediction, and non-uniformity is reduced on both the non-uniformity metrics.

In the RF fault, the delivered value of RF was 50 W above the value specified by the recipe. Points 7, 8, 9, and 10 show the effect of this fault on the process. Deposition rate for the two center points is near the 3-sigma limit, and stress is outside the 3-sigma limit. This fault insignificantly affects non-uniformity. Points 11 and 12 show the process outputs with the controller computed recipe. Both deposition rate and stress have been brought to target, and both non-uniformities are within allowable tolerances.

In the multiple fault, both pressure and gap were changed. The pressure was 5% less than the value specified by the recipe, and gap was 5 mils less than the value specified by the recipe. Points 13, 14, 15, and 16 show the effect of these faults on the process. Deposition rate is close to the 3-sigma limit for the center points. Stress is close to the specification limit. The first non-uniformity metric (nuc) has only minor affects. The second nonuniformity metric (nur) is slightly higher for the center points. Points 17 and 18 are the outputs from the controller computed recipe. Deposition rate, stress, and non-uniformity metric nuc are close to target, and non-uniformity metric nur is reduced.

The tests showed that the controller performed as expected. The controller was able to adjust the recipe in response to various faults to bring the process outputs well within allowable tolerances. For the goals for which SQC was performed with the controller computed recipe, the goals were within 1-sigma of the model prediction in most cases.

FIG. 4 shows a portion of the controller's performance during routine operation. The events marked "tuning" show a recipe computed by the controller in response to equipment drifts, shifts, and preventive maintenance.

Results obtained in the control experiments show that using site models as a basis to control non-uniformity enables one to simultaneously control a number of non-uniformity metrics.

The monitor wafer based controller was implemented and tested successfully for the PETEOS process on the AMT 5000 reactor. The embodiment of the PETEOS controller using site models and a separation between models and goals was derived. The models were tuned to comprehend a new process state, while the goals were optimized to keep the product parameters in control. Along similar lines, a separation of the sensor data versus model outputs were made. The model outputs were interpreted from the sensor data by a sensor to output model. The enhancement to the architecture was implemented in the PETEOS controller.

In summary, a technique has been described for simultaneously controlling one or multiple metrics of non-uniformity using a model form independent multi-variable controller.

Figure 5:
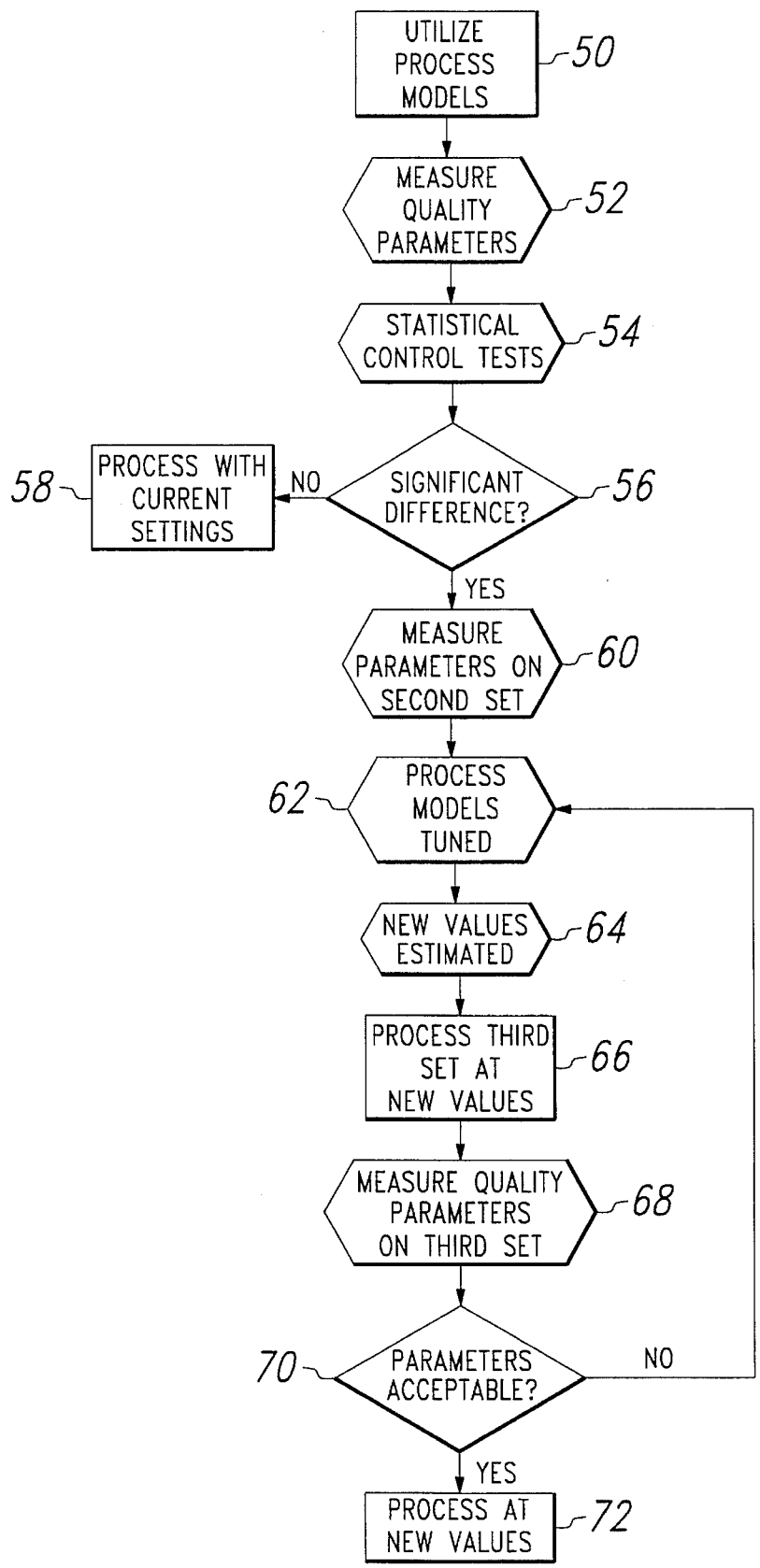
FIG. 5 is a flow diagram of the preferred embodiment.

An example flow diagram is depicted in FIG. 5. The flow diagram depicts a method of simultaneously controlling non-uniformity metrics in processing a discrete product. The method starts by utilizing process models of the discrete product relating a plurality of product quality parameters to a plurality of process control variable 50. In addition, the process models may include spatial models of the discrete product. The next step would by to measure the product quality parameters on a first set of products 52. Statistical quality control tests would then be exercised on the product quality parameters of the first set of products 54. If the statistical quality control tests do not indicate significant difference from model prediction and observables 56, the processing would continue normally 58. Otherwise, the plurality of product quality parameters would then be measured on a second set of products 60. The process models would then be tuned to create tuned process models using the product quality parameters from the first and the second set of products 62. The tuning estimates a changed state of the processing with the use of process models. New values would then be estimated for the process control variables from the tuned models 64. A third set of products would be processed at the new values of the process control variables 66. The product quality parameters would then be measured on the third set of products 68. The tuning of the process models and the estimating new values for the process control variables would be repeated if the product quality parameters from the third set of products are not acceptable 70. Otherwise, products would be continued to be processed with the new values of the process control variables if the product quality parameters from the third set of products are acceptable 72.

A few preferred embodiments have been described in detail hereinabove. The embodiments are not meant to limit the invention to the specific embodiments enclosed. The numbers used as values in the embodiments can be changed without changing the scope of the claimed invention. It is to be understood that the scope of the invention also comprehends embodiments different from those described, yet within the scope of the claims.

What is claimed is:

1. A method of simultaneously controlling a plurality of non-uniformity metrics in processing a discrete product, said method comprising:

utilizing process models of said discrete product relating a plurality of product quality parameters to a plurality of process control variables, wherein said process models include spatial models of said discrete product;

measuring said plurality of product quality parameters on a first plurality of products;

exercising statistical quality control tests on said plurality of product quality parameters of said first plurality of products;

continuing processing if statistical quality control tests do not indicate significant difference from model prediction and observables; otherwise measuring said plurality of product quality parameters on a second plurality of products;

tuning said process models to create tuned process models using said plurality of product quality parameters from said first and said second plurality of products, wherein said tuning estimates a changed state of said processing with the use of process models;

estimating new values for said plurality of process control variables from said tuned models;

processing a third plurality of products at said new values of said plurality of process control variables;

measuring said plurality of product quality parameters on said third plurality of products;

repeating said tuning of said process models and said estimating new values for said plurality of process control variables if said product quality parameters from said third plurality of products are not acceptable; otherwise continuing processing products with said new values of said plurality of process control variables if said product quality parameters from said third plurality of products are acceptable.

2. The method of claim 1, wherein said spatial models model metrics of non-uniformity and asymmetry as functions of sites.

3. The method of claim 1, wherein said plurality of product quality parameters is a function of a plurality of model outputs of said process models, thereby providing a separation of said plurality of model outputs from a predetermined set of goals.

4. The method of claim 1, wherein said tuning updates said process models based on inputs corresponding to local experiment design and measured values corresponding to process model outputs.

5. The method of claim 1, wherein said tuning optimizes said process models with respect to targets or constraints specified by a set of predetermined goals.

6. The method of claim 1, wherein said estimating new values includes optimization to achieve a set of predetermined goals.

7. A system for simultaneously controlling a plurality of non-uniformity metrics in processing a discrete product, said system comprising:

a processor for processing discrete products;

a means operable for utilizing process models of said discrete product relating a plurality of product quality parameters to a plurality of process control variables, wherein said process models include spatial models of said discrete products;

a means operable for measuring said plurality of product quality parameters on a plurality of products;

a means operable for exercising statistical quality control tests on said plurality of product quality parameters of said plurality of products;

a means operable for determining whether said statistical quality control tests are successful on reaching a predetermined set of goals;

a means operable for tuning said process models to create tuned process models using said plurality of product quality parameters, wherein said tuning estimates a changed state of said processing with the use of process models;

a means operable for estimating new values for said plurality of process control variables from said tuned models; and a memory for storing said new values.

8. The system of claim 7, wherein said spatial models model metrics of non-uniformity and asymmetry as functions of sites.

9. The system of claim 7, wherein said plurality of product quality parameters is a function of a plurality of model outputs of said process models, thereby providing a separation of said plurality of model outputs from said predetermined set of goals.

10. The system of claim 7, wherein said means operable for tuning updates said process models based on inputs corresponding to local experiment design and measured values corresponding to process model outputs.

11. The system of claim 7, wherein said means operable for tuning optimizes said process models with respect to targets or constraints specified by a set of predetermined goals.

12. The system of claim 7, wherein said means operable for estimating new values optimizes to achieve a set of predetermined goals.

13. A device for simultaneously controlling a plurality of non-uniformity metrics in processing a discrete product, said system comprising:

a means operable for utilizing process models of said discrete product relating a plurality of product quality parameters to a plurality of process control variables, wherein said process models include spatial models of said discrete products;

a means operable for measuring a plurality of product quality parameters on a plurality of products;

a means operable for exercising statistical quality control tests on said plurality of product quality parameters of said plurality of products;

a means operable for determining whether said statistical quality control tests are successful on reaching a predetermined set of goals;

a means operable for tuning said process models to create tuned process models using said plurality of product quality parameters, wherein said tuning estimates a changed state of said processing with the use of process models;

a means operable for estimating new values for said plurality of process control variables from said tuned models; and a memory for storing said new values.

14. The device of claim 13, wherein said spatial models model metrics of non-uniformity and asymmetry as functions of sites.

15. The system of claim 13, wherein said means operable for tuning updates said process models based on inputs corresponding to local experiment design and measured values corresponding to process model outputs.

16. The system of claim 13, wherein said means operable for tuning optimizes said process models with respect to targets or constraints specified by a set of predetermined goals.

17. The system of claim 13, wherein said means operable for estimating new values optimizes to achieve a set of predetermined goals.

* * * * *